(12) United States Patent
Lilly

(10) Patent No.: US 10,947,142 B2
(45) Date of Patent: Mar. 16, 2021

(54) APPARATUS AND METHODS FOR TREATING WASTEWATER

(71) Applicant: Suncor Energy Inc., Calgary (CA)

(72) Inventor: Brian Keith Lilly, Commerce City, CO (US)

(73) Assignee: Suncor Energy Inc., Calgary (CA)

( * ) Notice: Subject to any disclaimer, the term of this patent is extended or adjusted under 35 U.S.C. 154(b) by 795 days.

(21) Appl. No.: 15/693,766

(22) Filed: Sep. 1, 2017

(65) Prior Publication Data

US 2019/0071339 A1 Mar. 7, 2019

(51) Int. Cl.
| | |
|---|---|
| *C02F 1/24* | (2006.01) |
| *C02F 1/72* | (2006.01) |
| *C02F 1/76* | (2006.01) |
| *C02F 1/56* | (2006.01) |
| *C02F 9/00* | (2006.01) |
| C02F 1/68 | (2006.01) |
| C02F 103/10 | (2006.01) |
| C02F 1/52 | (2006.01) |

(Continued)

(52) U.S. Cl.
CPC .............. *C02F 9/00* (2013.01); *C02F 1/24* (2013.01); *C02F 1/5245* (2013.01); *C02F 1/54* (2013.01); *C02F 1/56* (2013.01); *C02F 1/66* (2013.01); *C02F 1/683* (2013.01); *C02F 1/722* (2013.01); *C02F 1/76* (2013.01); *C02F 2101/106* (2013.01); *C02F 2103/10* (2013.01); *C02F 2103/365* (2013.01); *C02F 2209/04* (2013.01); *C02F 2209/06* (2013.01)

(58) Field of Classification Search
CPC ...... C02F 1/24; C02F 9/00; C02F 1/56; C02F 1/683; C02F 1/76; C02F 1/5245; C02F 1/54; C02F 1/66; C02F 1/722; C02F 2209/04; C02F 2209/06; C02F 2103/10; C02F 2101/106; C02F 2103/365
USPC .............................. 210/703, 705, 221.1, 205
See application file for complete search history.

(56) References Cited

U.S. PATENT DOCUMENTS

| | | |
|---|---|---|
| 5,071,568 A | 12/1991 | Bennett et al. |
| 5,510,040 A | 4/1996 | Miller et al. |

(Continued)

FOREIGN PATENT DOCUMENTS

| | | |
|---|---|---|
| CA | 2792614 | 9/2011 |
| WO | 2013090569 | 6/2013 |

*Primary Examiner* — Thomas M Lithgow
(74) *Attorney, Agent, or Firm* — Gowling WLG (Canada) LLP

(57) ABSTRACT

Implementations of the present disclosure relate to an apparatus and a method for reducing a selenium-content of a fluid-input stream. The present disclosure includes components and steps for performing chemical modifications of a fluid-input stream and further components and steps for performing physical modifications of a chemically-manipulated fluid stream. When the fluid-input stream has a selenium content the chemical modification of the fluid-input stream drives at least a portion of the selenium content into a selenium-containing solids phase. The chemical modifications include at least oxidation, coagulation, chelation and flocculation. The present disclosure also includes components and steps for performing physical modifications that separate and remove some or all of the selenium-containing solids phase from the liquid phase, which reduces the selenium content of the liquid phase.

16 Claims, 3 Drawing Sheets

(51) Int. Cl.
    *C02F 1/54*         (2006.01)
    *C02F 1/66*         (2006.01)
    *C02F 101/10*     (2006.01)
    *C02F 103/36*     (2006.01)

(56) References Cited

U.S. PATENT DOCUMENTS

| | | |
|---|---|---|
| 5,993,667 A | 11/1999 | Overman |
| 6,156,191 A | 12/2000 | Overman |
| 7,419,602 B2 * | 9/2008 | Alexander ............ C02F 1/5236 210/705 |
| 8,282,835 B2 | 10/2012 | Schwarz et al. |
| 8,974,676 B2 | 3/2015 | Hughes et al. |
| 9,266,755 B2 | 2/2016 | Hughes et al. |
| 2011/0204000 A1 | 8/2011 | Reed et al. |
| 2016/0115053 A1 | 4/2016 | Okino et al. |

* cited by examiner

APPARATUS AND METHODS FOR TREATING WASTEWATER

TECHNICAL FIELD

The present disclosure generally relates to treating fluid waste streams. In particular, the disclosure relates to an apparatus and methods for reducing the selenium content of fluid waste streams.

BACKGROUND

Various industrial processes including but not limited to oil and gas refining processes and coal gasification produce a fluid waste stream that has high levels of selenium therein. Trace doses of selenium are essential for the health of many animals. However, even low doses of selenium are known to be toxic to many types of organisms. As such, many jurisdictions are changing their water-quality regulations in order to require low selenium content in industrial waste streams.

Selenium has many different oxidative states (+6, +4, +2, −2) and in each of these different oxidative states selenium can become incorporated into various water-soluble compounds. The water solubility of selenium-containing compounds poses a challenge for developing new approaches for reducing the selenium content of industrial waste streams to meet the regulated standards.

SUMMARY

Some implementations of the present disclosure relate to an apparatus for reducing a selenium content of a fluid-input stream. The apparatus comprises an oxidizing section, a coagulation section, a chelation and flocculation section and a flotation section. The oxidizing section is configured to receive the fluid-input stream and an oxidizing agent. The oxidizing section generates a first-product stream. The coagulation section is configured to receive at least a portion of the oxidized output stream and a coagulation agent. The coagulation section generates a second-product stream. The chelation and flocculation section is configured to receive at least a portion of the second-product stream, a chelating agent and a flocculating agent. The chelation and flocculation section generates a third-product stream that contains selenium containing solids. The flotation section is configured to receive at least a portion of the third-product stream. The flotation section has a first portion that is configured to retain the received portion of the third-product stream and to dissolve a gas therein and a second portion that is configured to allow the dissolved gas to form bubbles in the received portion of the third-product stream. The bubbles separate the selenium containing solids from the received third-product stream for generating a final-output stream. The final-output stream has a lower selenium content than the fluid-input stream.

Some implementations of the present disclosure relate to a method for reducing a selenium content of a fluid-input stream. The method comprises the steps of: adding an oxidizing agent to the fluid-input stream for generating a first-product stream; adding a coagulating agent to the first-product stream for generating a second-product stream with selenium-containing solids phase therein; creating floc solids from the selenium-containing solids phase by adding a chelating agent and a flocculating agent to the second-product stream for generating a third-product stream; dissolving a gas into the third-product stream by introducing the gas into the third-product stream and applying a first pressure; and generating bubbles of the dissolved gas by releasing the first pressure and separating the floc solids from the third-product stream for generating a fourth output stream. The fourth output stream has a lower selenium content than the fluid-input stream.

Implementations of the present disclosure can reduce the selenium content of a fluid stream. In some examples the selenium content of a fluid stream is reduced by at least about 50%, about 60%, about 70%, about 80% or about 90%. In some implementations of the present disclosure the selenium content of a fluid stream is reduced by at least about 95%, about 96%, about 97%, about 98%, about 99% or higher.

Without being bound by any particular theory, implementations of the present disclosure remove selenium compounds within a solids phase from the liquid phase while reducing or avoiding the release of selenium compounds from the solids phase back to the liquid phase. The chemical modifications of the present disclosure create a selenium-containing solids phase within a liquid phase. The physical modifications of the present disclosure separate and remove the selenium-containing solids phase from the liquid phase. The selenium-containing solids phase can be fragile and the selenium therein can dissociate from the solids phase and re-enter the liquid phase. Accordingly, the physical modifications are completed quickly and gently thereby decreasing or avoiding any disturbance of the selenium-containing solids phase, which can increase the amount of selenium removed from the liquid phase as compared to a slower or less gentle physical modification.

The physical modifications use bubbles that evolve within the liquid phase in response to a change in the pressure that is exerted upon the liquid phase. Implementations of the present disclosure can effectively remove a selenium-containing solids phase while maintaining the efficiency of the chemical steps. In contrast with known selenium removing processes, implementations of the present disclosure include a series of modifications to a fluid stream that occur with short time periods while avoiding the necessity of any settling ponds or tanks. This allows for a flow-through processing of the fluid stream that can reduce the selenium content of a fluid stream in a matter of minutes or hours rather than days or weeks.

BRIEF DESCRIPTION OF THE DRAWINGS

These and other features of the present disclosure will become more apparent in the following detailed description in which reference is made to the appended drawings, which illustrate by way of example only:

FIG. 2 is a schematic representation of a method according to the present disclosure for reducing the selenium content of a fluid stream, wherein FIG. 2A shows a schematic representation of an overall method; and FIG. 2B shows a schematic representation of further specific steps of the method.

DETAILED DESCRIPTION

Implementations of the present disclosure relate to apparatus and methods for treating wastewater streams. The apparatus and methods can reduce the selenium content of the wastewater streams.

The apparatus of the present disclosure includes components for performing chemical modifications of a fluid-input stream and further components for performing physical modifications of a chemically-manipulated fluid stream. When the fluid-input stream includes selenium content the chemical modification of the fluid-input stream drives at least a portion of the selenium content into a selenium-containing solids phase. The physical modification separates and removes the selenium-containing solids phase from the liquid phase thereby reducing the selenium content of the liquid phase.

The methods of the present disclosure include chemical-modification steps and physical-modification separation steps. The chemical steps alter the chemical environment of the fluid-input stream to cause at least a portion of the selenium content of the liquid phase to move into the solids phase. The physical separation steps separate at least a portion of the selenium-containing solids phase from the liquid phase thereby reducing the selenium content of the liquid phase.

Implementations of the present disclosure will now be described by reference to FIG. 1, FIG. 2 and FIG. 3.

Figure 1:
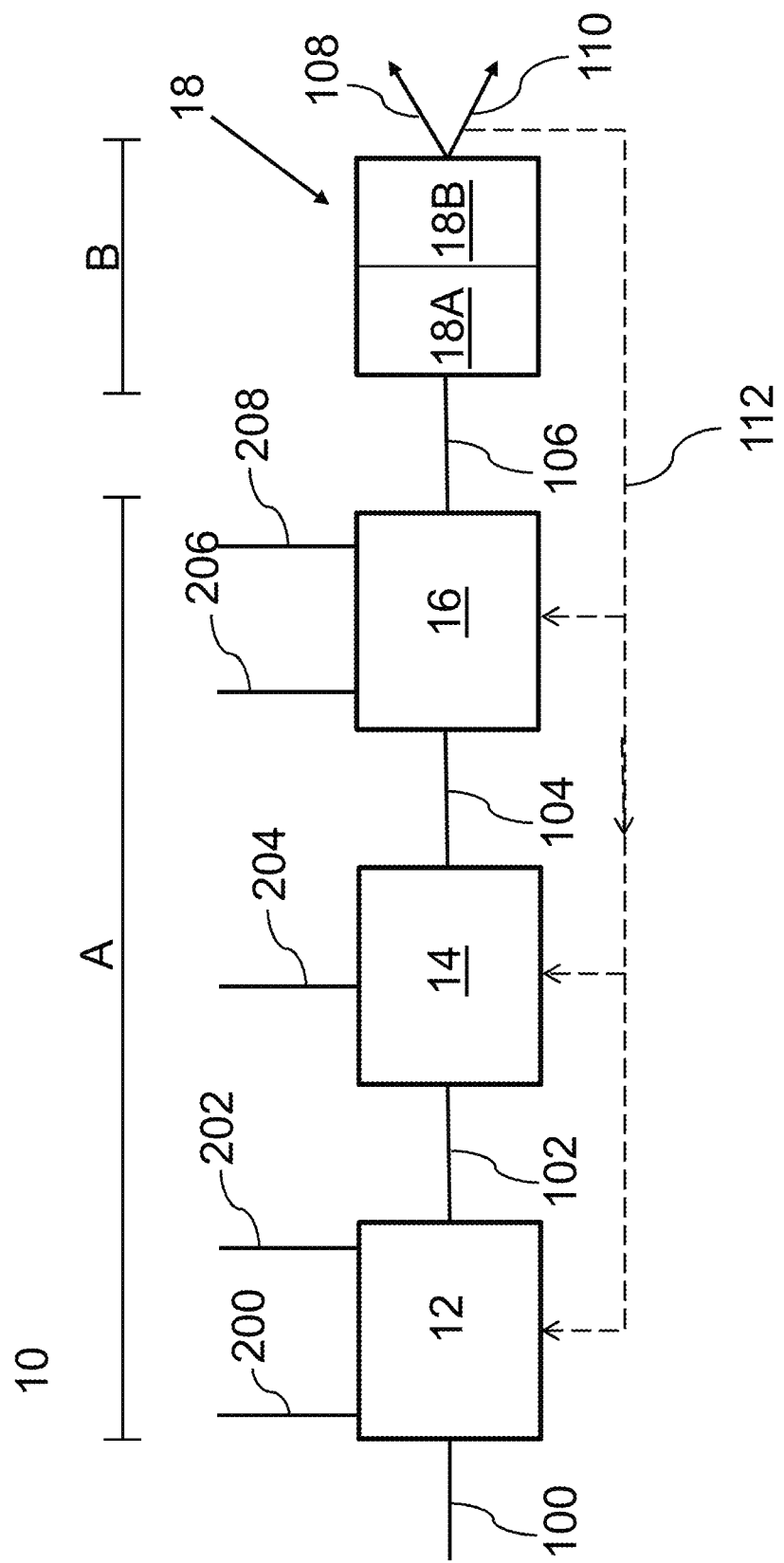
FIG. 1 is a schematic representation of an apparatus according to the present disclosure for reducing the selenium content of a fluid stream.
Figure 2:
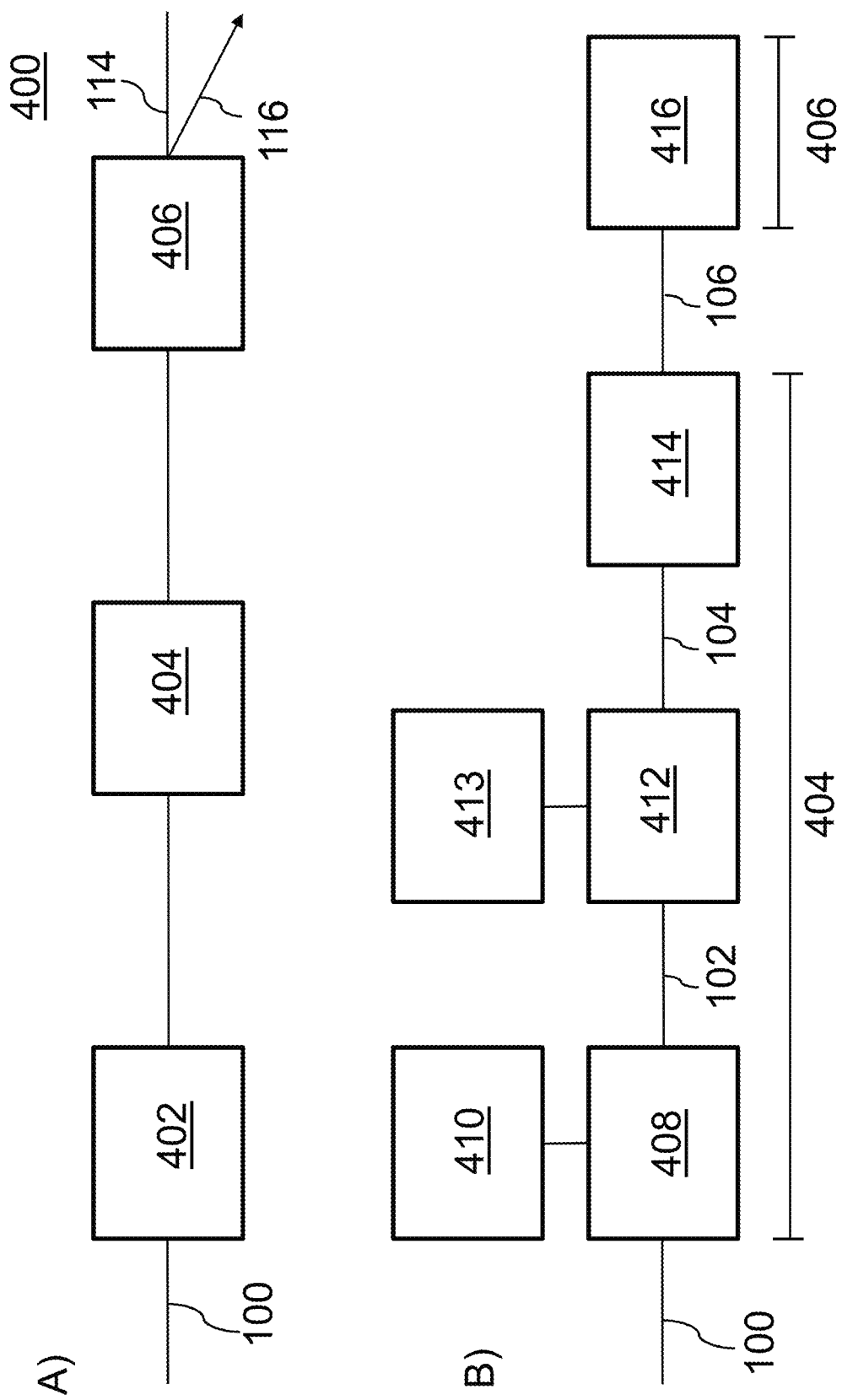

FIG. 1 shows one implementation of the present disclosure that relates to an apparatus 10 that can receive a fluid-input stream 100 and produce a fluid-output stream 110. The apparatus 10 includes a number of chemical-modification sections (shown collectively as A in FIG. 1) and one or more physical-modification sections (shown as B in FIG. 1) that treat the fluid-input stream 100 so that the fluid-output stream 110 has a lower selenium content than the fluid-input stream 100.

In some implementations of the present disclosure the apparatus 10 is a flow-through apparatus that does not include any containment vessels that retain or hold fluids for extended periods of time. Rather the apparatus 10 receives the fluid-input stream 100 and the fluid-input stream 100 flows through the various sections A, B with the overall objective of minimizing the residence times and agitation within any of the sections A, B. In general, fluids flow through the apparatus 10 in a direction from the chemical-modification sections A to the one or more physical-modification sections B. In reference to FIG. 1, the left-hand portion of the apparatus 10 can generally be referred to as "upstream" and the right-hand portion of the apparatus 10 can generally be referred to as "downstream". In general, the chemical-modification sections A are upstream of the one or more physical-modification sections B with the general exception of a recirculation loop 112 described further herein below.

The chemical-modification sections A that chemically modify the fluid-input stream 100 can be configured to be in fluid communication in a series arrangement. Each of the chemical-modification sections A will produce a product stream that flows downstream to a next section of the apparatus 10. There are one or more physical-modification sections B that receive and physically modify the product stream from the upstream chemical-modification sections A. If there are more than one of the physical-modifying sections B these sections can be arranged in series or in parallel. Optionally, the one or more physical-modifying sections B can also be in fluid communication with the first section of the chemical-modification sections A so that part of the product stream from the physical-modification sections B is circulated back upstream for further chemical and physical modification.

The fluid-input stream 100 can have a selenium content that is higher than desired. The source of the selenium content can be one or more prior processes that are industrial or not. In some implementations of the present disclosure the fluid-input stream 100 is a discharge stream of a prior industrial process that increases the selenium content of the prior process's discharge stream. The discharge stream can also be referred to as an effluent stream or a waste-product stream. The prior treatment process can be one that occurs in a coal gasification plant, an oil and gas refinery, a mining processing plant or any other process that produces an effluent with a higher than desired selenium-content. Typically, the prior treatment processes are processing extracts from natural geologic formations, which can be the primary source of the selenium. For example, it is known that hydrotreating and/or hydrodesulfurization (such as water-stripping) processes within a refinery can increase the selenium content of the hydrotreating discharge stream. In some instances, the hydrotreating discharge stream can contribute about 30% of the total liquid volume of the discharge stream from an oil and gas refinery. The selenium content within the refinery discharge stream can exceed desired levels such as those levels determined by water-quality regulations.

The apparatus 10 includes an oxidizing section 12, a coagulation section 14, a chelating and flocculation section 16 and a floatation section 18. In some implementations of the present disclosure, the sections 12, 14 and 16 chemically modify the fluids therein and the floatation section 18 physically modifies the fluids received from the chelating and flocculation section 16. As shown in the non-limiting example of FIG. 1, the sections 12, 14, 16 and 18 can be arranged in series with each section configured to receive a fluid stream and modify the fluid stream for providing a modified fluid stream that is received by the next section in the apparatus 10. The sections 12, 14, 16 and 18 can be fluidly connected to each other by one or more fluid conduits (not shown). In other implementations of the present disclosure, there can be one or more of each of the sections 12, 14, 16 and 18 that are connected in series or in parallel.

The oxidizing section 12 is configured to receive the fluid-input stream 100 and an oxidizing agent 200 so that the oxidizing agent 200 can oxidize the fluid-input stream 100 and so that some, most or substantially all of the reduced selenium within the fluid-input stream 100 is oxidized to the selenium ion selenite ($SeO_3^{-2}$), with an oxidative state of +4. In some implementations of the present disclosure, the oxidizing agent 200 oxidizes the selenium content of the fluid-input stream 100 with a desired oxidative-reduction potential (ORP) value of greater than about +275 mV. In some implementations of the present disclosure the desired ORP value is greater than +300 mV. The oxidizing agent 200 can be selected from a group that includes hydrogen peroxide, potassium permanganate, chlorine, sodium hypochlorite or combinations thereof.

The pH of the fluid-input stream 100 can also be adjusted in the oxidizing section 12 by the addition of a pH-adjusting agent 202 such as an acid or a base. In some implementations of the present disclosure the oxidative conversion to produce reduced selenium and an ORP value within the desired range can be optimized when the pH of the fluid-input stream 100 is below 7. In some implementations of the present disclosure, it is desirable for the fluid-input stream 100 to have a pH range between about 3.0 and about 5.0. In some implementations of the present disclosure it is desirable for the fluid-input stream 100 to have a pH range between about 3.8 and about 4.2. In some implementations of the present disclosure, the pH-adjusting agent can be selected from either sulfuric acid, hydrochloric acid or combinations thereof.

In some implementations of the present disclosure the oxidizing section 12 produces a first-product stream 102 that is oxidized, as compared to the fluid-input stream 100, and that is within a predetermined pH range. The first-product stream 102 can be fluidly communicated to the coagulation section 14. The coagulation section 14 is configured to receive the first-product stream 102 and a coagulating agent 204. The coagulating agent 204 will dissociate into a positive ionic-component and a negative ionic-component within the first-product stream 102. The positive ionic-component can bind with the ionic selenium. The coagulating agent 204 can be added to the first-product stream 102 in a range of between about 25 parts per million (ppm) to about 150 ppm. In some implementations of the present disclosure the coagulating agent 204 can be added in a range of between about 50 ppm and about 100 ppm. In some implementations of the present disclosure the coagulating agent 204 can be added in a range of between about 50 ppm and about 90 ppm. In some implementations of the present disclosure, the coagulating agent 204 can be selected from a group that includes ferric sulfate, ferric chloride or combinations thereof. Optionally, the coagulating section 14 can include a stirring mechanism for stirring or agitating the contents of the oxidizing section 14.

The coagulating section 14 produces a second-product stream 104 wherein at least some of the selenium content is bound with the positive ionic-component of the dissociated coagulating agent 204. The second-product stream 104 can be fluidly communicated to the chelation and flocculation section 16. The chelation and flocculation section 16 is configured to receive the second-product stream and one or both of a chelating agent 206 and a flocculating agent 208. The chelating agent 206 can bind with one or more metals, such as selenium, selenium ions or selenite, within the second-product stream 104 to form metal precipitates within the solids phase. In some implementations of the present disclosure the chelating agent 206 is a modified organic-sulfide, a polydithiocarbamate, the commercially available NALMET® 1689 chelating agent (NALMET is a registered trademark of the Nalco Chemical Company), the commercially available METCLEAR® chelating agents (METCLEAR is a registered trademark of BetzDearborn Inc.), or combinations thereof.

The flocculating agent 208 can facilitate the flocculation of the selenium-containing solids, which are also referred to herein as the selenium-containing solids phase. In some implementations of the present disclosure, the flocculating agent 208 can be a polymer flocculant, a high molecular weight polymer flocculant, a non-polymer flocculant or combinations thereof.

The chelating and flocculation section 16 produces a third-product stream 106 wherein at least some of the selenium content is bound with the chelating agent 206 and collected as selenium-containing floc solids or other aggregated selenium-containing solids within the third-product stream 106. The third-product stream 106 can be fluidly communicated to the floatation section 18. The floatation section 18 is configured to receive the third-product stream 106 and to physically separate the selenium-containing solids phase without disturbing the stability thereof and without increasing the free-selenium content of the third-product stream 106. The free-selenium content of the third-product stream 106 refers to any selenium that is not chemically or physically bound within the selenium-containing solids phase of the third-product stream 106. The selenium-containing solids phase can be suspended within the liquid phase of the third-product stream 106 as a homogeneous suspension or a non-homogeneous suspension.

The floatation section 18 utilizes a first section 18A and a second section 18B. Within the first section 18A a gas is introduced, typically near the bottom of the floatation section 18 by a gas inlet and impeller (not shown), and the gas is dissolved in the third-product stream 106 under pressure. The gas can be any gas that will neither create a flammable hazard nor chemically react with the other chemical constituents of the third-product stream 106. For example, nitrogen, argon and other suitable inert gases are useful. Within the second section 18B the pressure is decreased and the dissolved gas can evolve into very small bubbles that ascend through the third-product stream 106 and physically collect and float the selenium-containing solids phase to the surface of the third-product stream 106.

A skimmer (not shown) within the second section 18B physically removes the selenium-containing solids phase from the surface of the third-product stream 106. The skimmed selenium-containing solids phase 108 can be further processed, recycled or disposed of. In some implementations of the present disclosure, the floatation section 18 can also be referred to as a dissolved air floatation (DAF) device.

Because the selenium-containing solids phase is fragile, can become unstable, and selenium can re-enter the liquid phase, the floatation section 18 must quickly and gently separate the selenium-containing solids phase from the liquid phase.

The floatation section 18 generates the fluid-output stream 110, which has a lower selenium content than the fluid-input stream 100. Optionally some or all of the fluid-output stream 110 can be fluidly communicated back to the oxidizing section 12 or the coagulation section 14 or both in the recirculation loop 112 so that a given volume of the fluid-output stream 110 can pass through at least the sections 14, 16 and 18 of the apparatus 10 between 2 and 10 times. The recirculation loop 112 can facilitate a further reduction of the selenium content of the fluid-output stream 110 as compared to allowing a given volume of the fluid-output stream 110 to pass only once through the apparatus 10.

Regardless of the number of passes that the fluid-output stream 110 has through the apparatus 10, the fluid-output stream 110 can be mixed with any other industrial process effluent without any further chemical adjustment and the desired effluent selenium-content levels can be achieved.

Other implementations of the present disclosure relate to a method 400 for reducing the selenium content of the fluid-input stream 100. As shown in FIG. 2, the method 400 includes the steps of receiving 402 the fluid-input stream 100, chemically modifying 404 the fluid-input stream 100 and physically modifying 406 the chemically modified fluid-input stream 100. The method 400 produces a fluid output 114 with a lower selenium content than the fluid-input stream 100 and a selenium-containing output 116.

The steps of chemically modifying 404 causes some or most or all the selenium content of the fluid-input stream 100 to move from a liquid phase of the fluid-input phase 100 into a selenium-containing solids phase.

In some implementations of the present disclosure the steps of chemically modifying 404 the fluid-input phase 100 includes a step of adding the oxidizing agent 408 to the fluid-input stream 100 for generating the first-product stream 102. In some implementations of the present disclosure the amount of oxidizing agent 408 to be added can be determined by achieving a desired ORP value of greater than about +275 mV. In some implementations of the present disclosure, the desired ORP value is greater than about +300 mV. The oxidizing agent can be selected from a group that includes hydrogen peroxide, potassium permanganate, chlorine, sodium hypochlorite or combinations thereof. In some implementations of the present disclosure the step of adding the oxidizing agent 408 can be limited to a residence time of between about 1 minute and twenty minutes. In other implementations of the present disclosure this residence time can be further adjusted based upon periodic laboratory analysis and the overall process conditions of the method 400.

In some implementations of the present disclosure the steps of chemically modifying 404 the fluid-input phase 100 includes a further step of adding the pH-adjusting agent 410 to adjust the pH of the fluid-input phase 100 to a pH range of seven or less. In some implementations of the present disclosure it is desirable for the fluid-input stream 100 to have a pH range between about 3.0 and about 5.0. In some implementations of the present disclosure it is desirable for the fluid-input stream 100 to have a pH range between about 3.8 and about 4.2. In some implementations of the present disclosure the pH-adjusting agent can be an acid. For example the acid can be selected from either sulfuric acid, hydrochloric acid or combinations thereof.

The step of adding a pH-adjusting agent 410 can occur before, during or after the step of adding the oxidizing agent 408 and this can occur in the same reaction vessel with a residence time that is the same as, shorter, or longer than the residence time required to achieve the desired ORP value for the oxidation reaction that occurs after step 408.

The steps of chemically modifying 404 the fluid-input phase 100 can include a further step of adding the coagulating agent 412 to the first-product stream 102 for generating the second-product stream 104 with a selenium-containing solids phase therein. In some implementations of the present disclosure the coagulating agent can be added in a range of between about 25 ppm and about 150 ppm. In other implementations of the present disclosure the coagulating agent can be added in a range of between about 50 ppm and about 100 ppm. In some implementations of the present disclosure the coagulating agent can be added in a range of between about 50 ppm and about 90 ppm. In some implementations of the present disclosure the coagulating agent can be selected from a group that includes ferric sulfate, ferric chloride or combinations thereof. The step of adding the coagulating agent 412 can be limited to a residence time of between about 1 minute and ten minutes. Optionally, the fluids and chemical agents within the reaction vessel where the coagulating agent is added can be mixed with a step of stirring 413.

The second-product stream 104 can be chemically modified by a step of adding the chelating agent and adding a flocculating agent 414 for creating floc solids from the selenium-containing solids phase and for generating the third product stream 106. In some implementations of the present disclosure the chelating agent is a modified organic-sulfide, a polydithiocarbamate, the commercially available NALMET® 1689 chelating agent, the commercially available METCLEAR® chelating agents or combinations thereof. The flocculating agent can facilitate the flocculation of the selenium-containing solids. In some implementations of the present disclosure the flocculating agent can be a polymer flocculant, a high molecular weight polymer flocculant, a non-polymer flocculant or combinations thereof.

The steps of physically-modifying 404 the third-product stream 106 includes the step of separating 416 the selenium-containing solids from the liquid phase and removing 418 the selenium-containing solids phase from the liquid phase.

The step of separating 416 includes the steps of dissolving a gas into the liquid phase and generating bubbles from the dissolved gas. The bubbles ascend through the liquid phase and physically collect and float the selenium-containing solids phase to the surface of the liquid phase. The step of removing 418 the solids can include a step of skimming the surface and removing the selenium-containing solids phase. The skimmed and removed selenium-containing solids phase can be further processed, recycled or disposed of. When the selenium-containing solids are removed the remaining liquid phase can be referred to as the fluid output 114.

In some implementations of the present disclosure the steps of the method 400 and any subsequent chemical modifications can occur as a flow-through process or method within residence times in the order of minutes or hours rather than days or weeks. Furthermore, the physical separation and removing of the selenium-containing solids phase can be performed in the order of minutes or hours rather than days or weeks.

In some implementations of the present disclosure the method 400 can include a step of recirculating some or all of the fluid output 114 back into the vessel where the step of adding the oxidative agent 408 or the vessel where the step of adding the coagulating agent 412 or both. Then the steps of adding the coagulating agent 412, adding the chelating agent and adding the flocculating agent 414 and separating 416 can be repeated for each step of recirculating before the fluid output 114 is no longer recirculated or processed using the method 400. In some implementations of the present disclosure, the method 400 can include between 2 and 10 steps of recirculating.

EXAMPLE 1

Chemical Modifications

Effluent from a hydrodesulfurization process, such as sour-water stripping, within an oil and gas refinery can be relatively free of ions since the effluent originates as steam (from a prior water treatment for reducing water hardness) and due to the "sour" nature (presence of hydrogen sulfide ($H_2S$)) would be expected to contain the following average concentrations: about 1 ppm wt to about 10 ppm wt $H_2S$; about 1 ppm wt to about 20 ppm wt ammonia; and about 100 µg/L to about 800 µg/L total selenium.

In Example 1, a stripped sour water (SSW) effluent from a sour-water stripping process was used as the fluid-input stream 100 and treated with the chemical modifications of sections 12, 14 and 16 of the apparatus 12 as described herein above. The SSW fluid-input stream had a total selenium concentration of between about 200 µg/L to about 720 µg/L with about 98% of the selenium present in a soluble form. The SSW was introduced into an oxidation section and treated with hydrogen peroxide as the oxidizing agent and sulfuric acid as the pH-adjusting agent to achieve an ORP of greater than 400 mV and a pH between about 3.5 to about 4. The SSW fluid-input was retained in the oxidative section under these reaction conditions for about 10 to about 20 minutes to produce the first-product stream.

The first-product stream was then introduced into the coagulation section where iron (III) sulfate (ferric sulfate) was used as the coagulation agent to treat the first-product stream. Within the coagulation section, without being bound by any particular theory, the iron (III) sulfate dissociated and the iron cation (Fe +3) reacted with the selenium (Se +4). To a lesser extent it is possible that the iron cation (Fe +3)

reacted with any over-oxidized selenium (Se +6) from the oxidation section. After about 3 or about 4 minutes small solid particles that contained selenium were observed. The small solid particle were co-precipitates of iron and selenium. The coagulation section generated the second-product output that contained a liquid phase and selenium-containing solids phase. The second-product output was then introduced into the chelation and flocculation section where Nalmet® 1689 was used as the chelating agent and a non-ionic, polymer was used as the flocculating agent (commercially available as Nalco 8181 form Nalco Water, an Ecolab Company). The solids generated within the chelating and flocculation section represented about 95% to about 99% of the selenium content of the SSW. However, when the chemical modifications were completed the selenium content of the solids phase was unstable and decreased over time resulting in the selenium-content of the liquid phase increasing over time.

EXAMPLE 2

Chemical Modifications and Physical Modifications

The fluid product of the chemical modifications, with the selenium-containing solids phase therein, were fluidly communicated to a floatation section 18, in this case a Multifloat MFV-100 high rate dissolved air floatation clarifier (DAF) (available from Krofta Technologies of Massachusetts, U.S.A.) was used. Table 1 below shows an example of flow rate data in gallons per minute (GPM) and selenium content data (µg/L). This data was obtained over a five day period in which SSW was fluidly communicated to the chemical-modification sections described in Example 1. About half of the SSW flow into the chemical-modification sections was fluidly communicated to the DAF for separation of the selenium-containing solids phase from the liquid phase. In some implementations of the present disclosure multiple DAFs can be fluidly connected in parallel and/or in series to accommodate larger input flows and to separate and remove further selenium from the liquid phase.

TABLE 1

A summary of flow rates and selenium content of SSW before and after treatment with chemical and physical modifications according to the present disclosure.

| Day | Total SSW Flow Rate (gpm) | SSW Selenium Before Treatment (µg/L) | Flow Rate to DAF (gpm) | Selenium After Treatment (µg/L) |
| --- | --- | --- | --- | --- |
| 1 | 194.52 | 483 | 96 | 42 |
| 2 | 192.11 | 507 | 100 | 80 |
| 3 | 192.68 | 441 | 99 | 85 |
| 4 | 193.25 | 484 | 99 | 61 |
| 5 | 194.69 | 433 | 98 | 36 |

Figure 3:
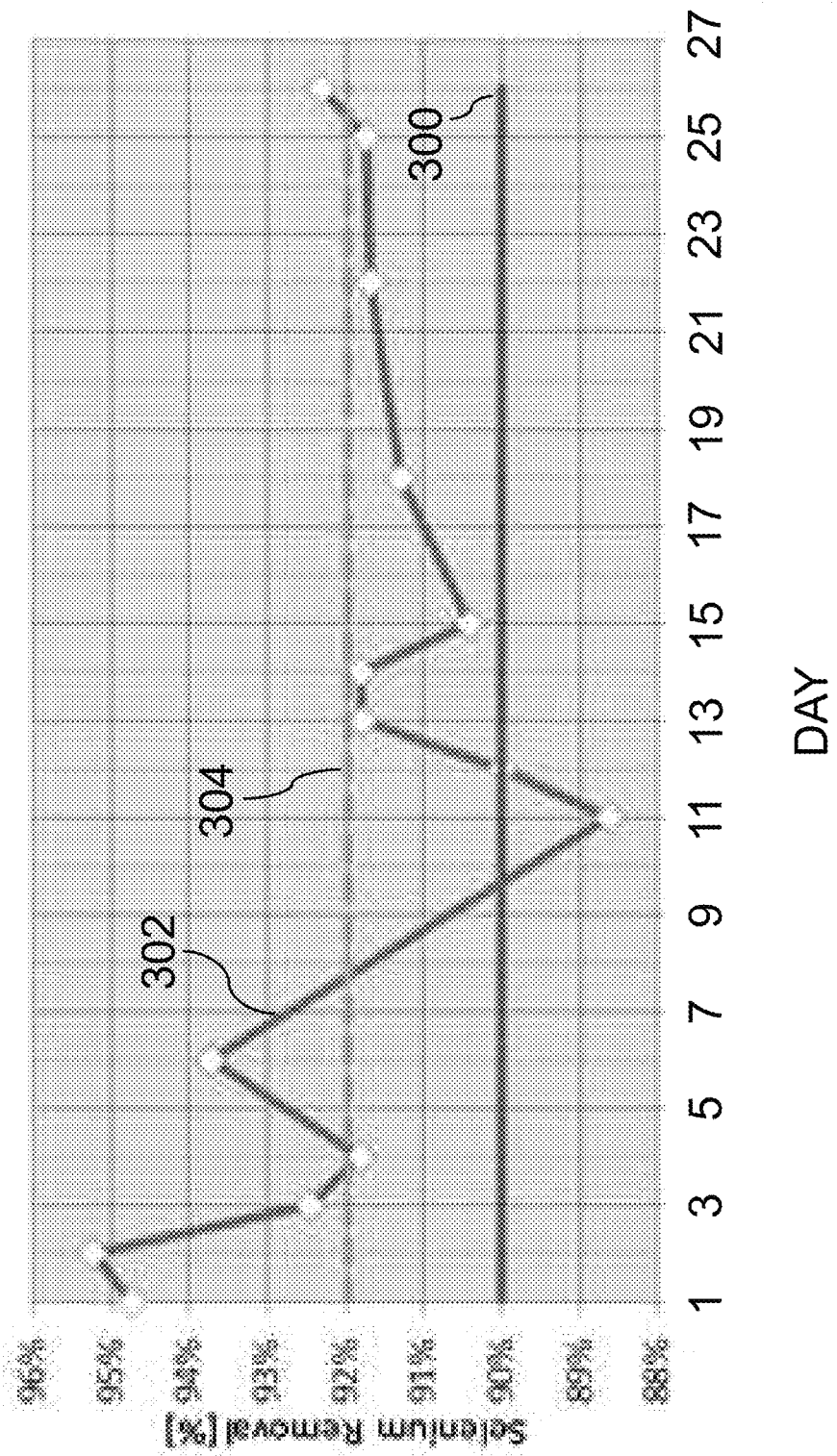
FIG. 3 is a line graph of an example of selenium-removal data at various time points that were achieved using an implementation according to the present disclosure.

FIG. 3 is a line graph that shows the percent selenium removal over 26 days. Line 300 shows one example of a desired percent-selenium removal for effluents from industrial processes that are introduced back into the environment. Line 302 shows the percent of selenium that was removed by the chemical modifications and the physical modifications. Line 304 shows the average selenium removal of about 92% over the 26 day period, which is a greater percentage than the desired percent-selenium removal of 90%.

I claim:

1. A flow-through method for reducing a selenium content of a fluid-input stream, the method comprising steps of:
    a. adding an oxidizing agent to the fluid-input stream for generating a first-product stream;
    b. adding a pH-adjusting agent to either the fluid-input stream or the first-product stream;
    c. adding a coagulating agent to the first-product stream for generating a second-product stream with selenium-containing solids phase therein;
    d. creating floc solids from the selenium-containing solids phase by adding a chelating agent and a flocculating agent to the second-product stream for generating a third-product stream;
    e. dissolving a gas into the third-product stream by introducing the gas into the third-product stream and applying a first pressure; and
    f. generating bubbles of the dissolved gas by releasing the first pressure and separating the floc solids from the third-product stream for generating a fourth output stream, wherein the first-product stream has an oxidation-reduction potential of greater than about +275 millivolts (mV), a pH of between about 3.0 and about 5.0, and a lower selenium content than the fluid-input stream.

2. The method of claim 1, wherein the first-product stream has a pH of between about 3.8 to about 4.2.

3. The method of claim 1, wherein the pH-adjusting agent is an acid.

4. The method of claim 3, wherein the acid is either sulfuric acid or hydrochloric acid.

5. The method of claim 2, wherein the oxidizing agent is selected from a group consisting of hydrogen peroxide, potassium permanganate, chlorine and sodium hypochlorite.

6. The method of claim 2, wherein the coagulating agent is selected from a group consisting of ferric chloride, ferric sulfate and a combination thereof.

7. The method of claim 2, wherein the coagulating agent is ferric sulfate.

8. The method of claim 2, wherein the step of adding the coagulating agent adds between about 45 parts per million (ppm) and about 95 ppm of the coagulating agent to the first-product stream.

9. The method of claim 2, wherein the chelating agent is a modified organic-sulfide.

10. The method of claim 2, wherein the chelating agent is a polydithiocarbamate.

11. The method of claim 2, wherein the flocculating agent comprises a polymer.

12. The method of claim 2, wherein the dissolved gas is air or an inert gas.

13. The method of claim 2, wherein the fluid stream is a refinery sour-water stream.

14. The method of claim 2, further comprising a step of repeating at least the steps (b), (c), (d), (e) and (f) of claim 4 with at least a portion of the fourth output stream.

15. The method of claim 2, wherein the step of adding an oxidizing agent to the fluid-input stream for generating a first-product stream occurs within between about one minute and twenty minutes.

16. The method of claim 2, wherein the step of adding a coagulating agent to the first-product stream for generating a second-product stream with selenium-containing solids phase therein occurs within between about one minute and ten minutes.

* * * * *